(No Model.) 2 Sheets—Sheet 1.
J. E. PITRAT.
WEIGHING AND PRICE SCALE.
No. 356,077. Patented Jan. 11, 1887.
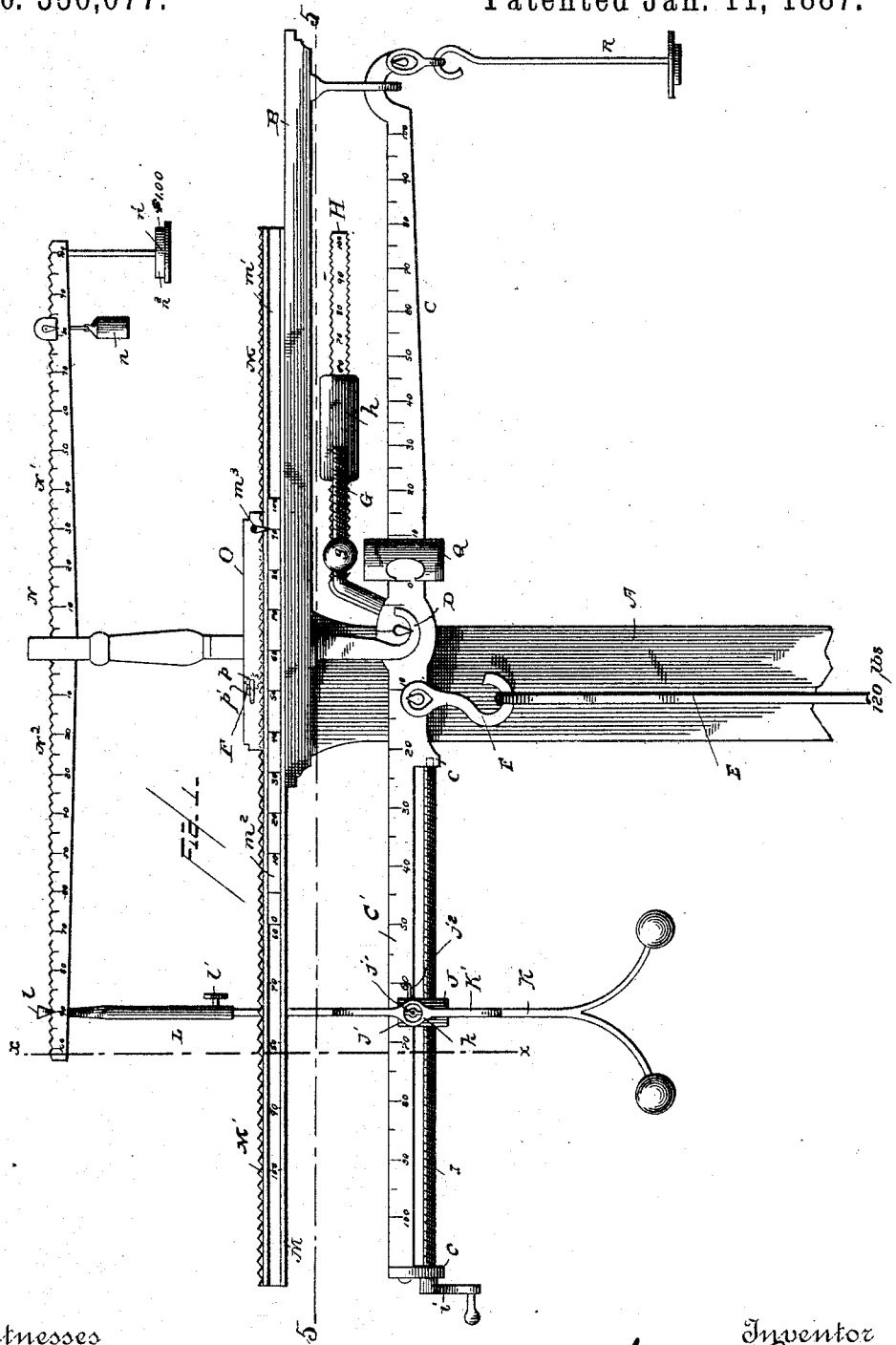

(No Model.)  2 Sheets—Sheet 2.
J. E. PITRAT.
WEIGHING AND PRICE SCALE.
No. 356,077. Patented Jan. 11, 1887.
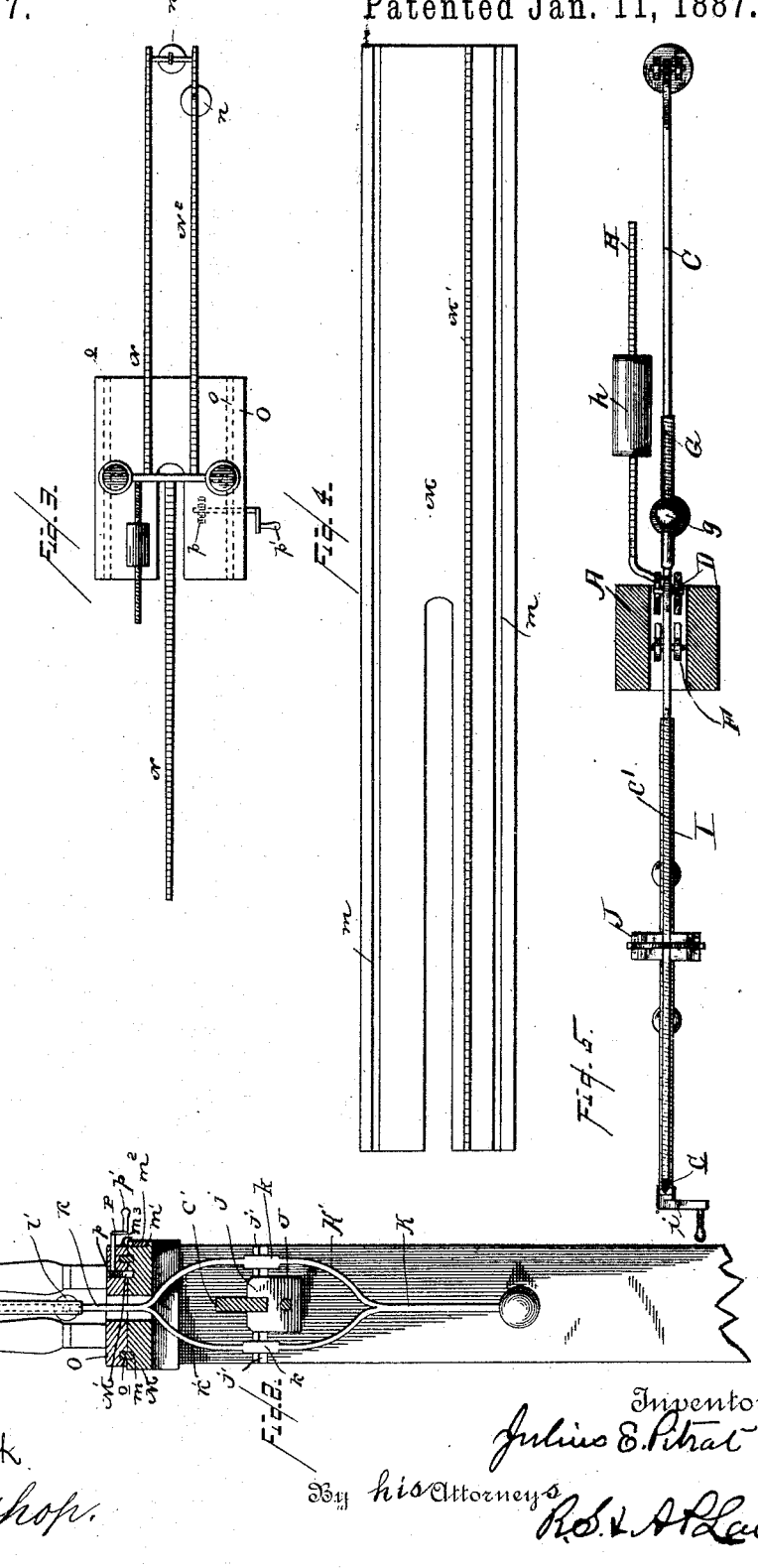
Witnesses
Norris A. Clark.
R. W. Bishop.
Inventor
Julius E. Pitrat
By his Attorneys
R. S. & A. Lacey

UNITED STATES PATENT OFFICE.

JULIUS E. PITRAT, OF GALLIPOLIS, OHIO.

WEIGHING AND PRICE SCALE.

SPECIFICATION forming part of Letters Patent No. 356,077, dated January 11, 1887.

Application filed March 26, 1886. Serial No. 196,682. (No model.)

*To all whom it may concern:*

Be it known that I, JULIUS E. PITRAT, a citizen of the United States, residing at Gallipolis, in the county of Gallia and State of Ohio, have invented certain new and useful Improvements in Weighing and Price Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to weighing and price scales, and has for its object to furnish a more direct and positive means for coupling together ordinary weighing-beams with certain devices, known as "price-scales," whereby the joint action and scope of each is increased without detriment to either when used separately.

It consists in the novel features more fully hereinafter set forth and claimed, and shown in the annexed drawings, in which—

Figure 1 is a side view of the upper portion of an ordinary platform-scale having my improvements in position. Fig. 2 is a section on the line X X of Fig. 1. Fig. 3 is a plan view of the price-scales. Fig. 4 is a plan view of the sub-base over which the price-scales move. Fig. 5 is a section on the line 5 5 of Fig. 1 on a reduced scale.

To illustrate the application of my improvements, the upper portion of an ordinary platform-scale is shown, in which A is the standard; B, the overhanging arm; C, the beam; D, the beam-support or fulcrum; E, the rod connecting the beam with the platform in the usual manner by means of a link, F.

In carrying out my invention it has been found expedient to extend the beam C to the left of its fulcrum, forming a supplemental beam, C', which is graduated to correspond with the graduations on the right-hand branch, C, which graduations on each beam number from the fulcrum D, and for convenience are indicated decimally from 10 to 100.

The supplemental beam C' may form an integral part of the beam C, in which case it will be an extension, or it may be separate and attached thereto.

A threaded rod, G, attached to the beam and projecting to the right-hand side of its fulcrum, is provided with an internally-threaded weight, $g$, adjustably secured thereon to preserve a perfect equilibrium between the two branches of the beam. A second rod, H, flattened and longer than rod G, or forming an extension thereof, projects from the beam, and, extending nearly parallel therewith, is threaded on its upper and lower edge to receive a counterpoise, $h$, correspondingly threaded on its interior. The rod H is graduated from 1 to 100 on its flattened side, similar to the graduations on the beams C C', for a purpose presently made known.

Threaded rod I is journaled lengthwise of the branch C' of the beam, and is located preferably beneath the beam and mounted at each end in offsets $c$. The rod is rotated in its bearings by means of a crank, $i$, on its outer end. A nut or carrier, J, mounted on the rod I, has projections $j$ extending up alongside the sides of the beam, to give greater steadiness thereto in its movements over the rod. That part of the nut between the projections bears on the under side of the beam and relieves the rod I from any strain due to the upward pull on the carrier in the operation of the device. Arms $j'$, extending laterally from each side of the nut or carrier, support the rod K, which latter is divided and opened, forming branches K', which extend on each side of the carrier and have eyes $k$ to receive the said arms. The lower end of the rod is bifurcated and weighted to give greater steadiness thereto in its movements and check undue oscillation in the plane of its direction of travel. The upper end of the rod K telescopes with a connection, L, having a knife-edge hook, $l$, on its upper end. The connection L is preferably tubular, and the end of the rod K is adjustably held therein by means of a set-screw, $l'$. A pointer, $j^2$, extending from the carrier, travels in close proximity to the graduations on the beam C' and serves as a means to indicate the proper adjustment of the carrier to the beam.

A guide or sub-base, M, secured to the top of the arm of the platform-scales, projects over the left branch or beam, C', and supports a price-scale, N, consisting of a beam having right and left branches, N' N², respectively. This price-scale may be of any approved form, but that patented by me, No. 314,717, or No. 341,166, is the preferred form, as it is better adapted for use with my improvements. Fig. 3 shows a plan view of such scale, and no claim is made to anything shown therein as forming a part of the present invention.

The base O of the price-scales is provided with tongue o, near each edge, to enter corresponding grooves, m, in the sub-base M, by which it is guided in its movement and prevented from lateral displacement. To facilitate the movement of the price-scale over the sub-base, the latter is provided with a rack, M', which is engaged by a pinion, p, keyed to a shaft, P, journaled in the base N. This shaft is rotated by means of a crank, p', on its outer end. The price-scales may be moved to the right and left by rotating the shaft P either to the right or left, as will be readily understood.

The edge of the sub-base is provided with a dovetail groove, m', in which is seated a slide, $m^2$, and a pointer, $m^3$, extending from the base of the price-scales, overhangs the slide to facilitate the adjustment of said scales relative to the sub-base.

The branches C C' composing the main beam, the rod H, branching therefrom, the bottom of the groove m' in the edge of the sub-base, the slide $m^2$ seated therein, and the arms of the price-scales should be graduated alike, as shown, for convenience, facility, and efficiency in the use of the device.

In practice, when the two sets of scales are in readiness for use, the hooked end of the connection L rests on the upper edge of the left beam of the price-scales, and the bob-weight n and the weight-carrier n' on the right branch, N', may be adjusted or supplied with additional weights, respectively, as occasion may require. In case it is desired to use the weighing-scales alone, the bob-weight n may be transferred from the right to the left branch, which will depress the latter and disengage the link l therefrom, which will permit free use of the weighing-scales. Another way would be to loosen the set-screw l', thus permitting the rod K to move freely without imparting any motion to the price-scales. These arrangements just described will permit the free use of each set of scales separately, as is manifest.

When it is desired to use both scales connectedly for the purpose of ascertaining the value of an article, proceed as follows:

Having placed the substance on the platform, cause the weighing-beam C to go down and stay down by moving the bob-weight Q toward the outer end. If this be not sufficient, place enough weight upon the depending carrier R to do it; or the beam may be depressed in any manner so as to cause a corresponding elevation of the left branch or extension C', which will lift the hook l off the left branch N' of the price-scales and permit the scales to be moved to the right or left till the proper point on the left branch thereof is directly beneath the hook, which, when lowered, will fall into the desired notch—that representing the rate. In order that the price-scales may be properly adjusted relative to the weighing-scale, which is when the hook l is in the notch on its left branch corresponding with or indicating the rate and the rod K and connection L are in a perpendicular line, the parts are so disposed that the zero end of the slide $m^2$ is at a point on the sub-base corresponding with the rate and the pointer or index $m^3$ of the base is on a point on the slide corresponding with the price. The price-scales being adjusted to the proper position, and the hook l of the coupling-bar being in engagement with the desired notch of its left branch, the scales are in readiness for computing the value of articles of different weights placed on the platform-scales, provided the rate is uniform, by adjusting the bob-weight n on the right branch; and if it be not sufficient to depress the same, supply additional weights to the carrier n' till said arm is depressed. The sum of the value represented by such weight or weights and that indicated by the bob-weight will indicate the true value of the article. For example, suppose the article be wheat, weighing one hundred and twenty pounds, as indicated by the figures at the end of the rod E, worth ninety cents per bushel of sixty pounds. The carrier should be adjusted to 60 on the left branch or extension C' of the weighing-beam, this being the rate. Next, the zero end of the slide $m^2$ is adjusted to come opposite 60 on the bottom of the groove in the sub-base. Then the price-scales are adjusted till the pointer $m^3$ corresponds with the price, which is 90. When these adjustments are made, the hook l will drop into the notch represented by 90. The bob-weight n being insufficient to overbalance the load, an additional weight, $n^2$, representing one dollar in value, is supplied to the carrier, the point at which the bob-weight causes a depression of the right branch $N^2$ of the price-scales being 80, which, added to the one dollar, will give one dollar and eighty cents as the value.

In ascertaining the value of quantities on the decimal scale rated at 100, place the carrier at 100 and adjust the other parts correspondingly. If per bushel of sixty, thirty-two, or any other number of pounds, proceed accordingly, as above described.

When the carrier is adjusted to the desired position, the counterpoise h may be correspondingly adjusted on the threaded rod H, in order to effect a perfect equilibrium between the two branches of the main beam. Thus when the carrier is adjusted to 60 the weight h is correspondingly adjusted to 60 on the rod H, as clearly indicated in Fig. 1. During the operation of computing the value the bob-weight Q must be at zero and the depending-carrier R must be free of all weights.

Having thus described my invention, what I claim, and desire to secure by Letters Patent, is—

1. The combination, with the main beam of an ordinary weighing-scale, a supplemental beam extending in an opposite direction, and an arm or rod branching from the beam near its fulcrum and extended in the direction of the main beam, said beams and arms being similarly graduated, of a carrier mounted upon the supplemental arm and adjustable longitudinally thereon, and a counterpoise upon the arm for preserving an equilibrium of the main and supplemental beams at any adjustment of the carrier, substantially as set forth.

2. The combination of the main beam, a supplemental beam extending in an opposite direction thereto, an arm branching from the beam near its fulcrum and extended in the direction of the main beam, a price-scale having right and left branches, each arranged to extend in the direction of the beams, respectively, said beams, arm, and branches of the price-scale being similarly graduated, a carrier movable along the supplemental beam, a bar supported by said carrier and adapted to engage with the price-scales, and a counterpoise adjustably mounted upon the arms to counterbalance the carrier and bar at any adjustment, substantially as set forth.

3. The combination of the main beam, an extension forming a supplemental beam, a rod or arm branching from the main beam near its fulcrum and extending in the direction thereof, the price-scale arranged as described, a carrier mounted on the supplemental beam and movable longitudinally thereon, an adjustable telescoping connection supported by said carrier and adapted to be engaged with the price-scale, and a counterpoise adjustably mounted upon the arm to balance the main and supplemental beams at any point of adjustment of the carrier, substantially as and for the purpose set forth.

4. The combination of the weighing-scales and a set of price-scales movable to and fro relative thereto, with an adjustable or telescoping connection interposed between the two, substantially as and for the purposes set forth.

5. The combination of the main beam of the weighing-scales, having an extension, the price-scales movable to and fro in the plane of the beam and substantially parallel therewith, a carrier movable along the extension, a telescoping connection supported by the carrier and in engagement with the price-scales, and a counter-balance movable along a rod connected with the main beam, to neutralize the weight of the carrier and its connections at any point of adjustment on the extension, substantially as described.

6. The combination of the overhanging arm and weighing-beam of the weighing-scales, a sub-base secured thereto and graduated to correspond with the graduations of the weighing-beam, a corresponding graduated movable slide, and the price-scales mounted on said sub-base and movable thereon in a parallel plane, said movement of the scales being regulated by the graduations on the sub-base and the movable slide, substantially as and for the purpose set forth.

7. The combination of the weighing-beam, the graduated sub-base, a graduated movable slide, price-scales mounted on and movable to and fro over the sub-base, and a movable connection interposed between the beam and price-scales, substantially as described.

8. The combination of the weighing-beam and price-scales of a carrier held against the under side of the beam and having projections extending up on each side thereof and provided with arms branching laterally therefrom, and a connection interposed between the price-scales and beam and supported on the arms of the carrier, substantially as set forth.

9. The combination of the main and supplemental beams, a threaded rod journaled lengthwise of the supplemental beam, a carrier supported on said rod and adjusted thereby, price-scales movable relative to the beams, a connection interposed between the price and weighing scales and supported by the carrier and movable therewith, substantially as set forth, and a counterpoise for said connection and its carrier adjustably connected with the main beam, substantially as set forth.

In testimony whereof I affix my signature in presence of two witnesses.

JULIUS E. PITRAT.

Witnesses:
A. F. MOORE,
EMILE J. PITRAT.